March 3, 1953 C. E. GIFFORD ET AL 2,630,291
VALVE APPARATUS
Filed Feb. 4, 1949

INVENTORS.
Charles E. Gifford,
Cecil B. Howse.
BY
Harness, Dickey & Pierce
ATTORNEYS.

Patented Mar. 3, 1953

2,630,291

UNITED STATES PATENT OFFICE 2,630,291

VALVE APPARATUS

Charles E. Gifford and Cecil B. Howse, Port Huron, Mich., assignors to Mueller Brass Company, Port Huron, Mich., a corporation of Michigan Application February 4, 1949, Serial No. 74,514

10 Claims. (Cl. 251—49)

This invention relates generally to fluid controlling valves and is particularly adapted among other uses in connection with valves for refrigerating systems.

An object of this invention is to provide such a valve which when assembled will be fluid tight.

Another object of this invention is to provide such a valve which may be quickly disassembled for repair or replacement of parts.

Another object of this invention is to provide such a valve in which the bonnet is sealed to the valve body by means of a radially compressible sealing member.

Another object of this invention is to provide means for breaking the seal between the bonnet and body prior to complete removal of the bonnet from the body member.

Another object of this invention is to provide a novel type of resilient connection for connecting the valve disk to the valve stem.

Figure 1:
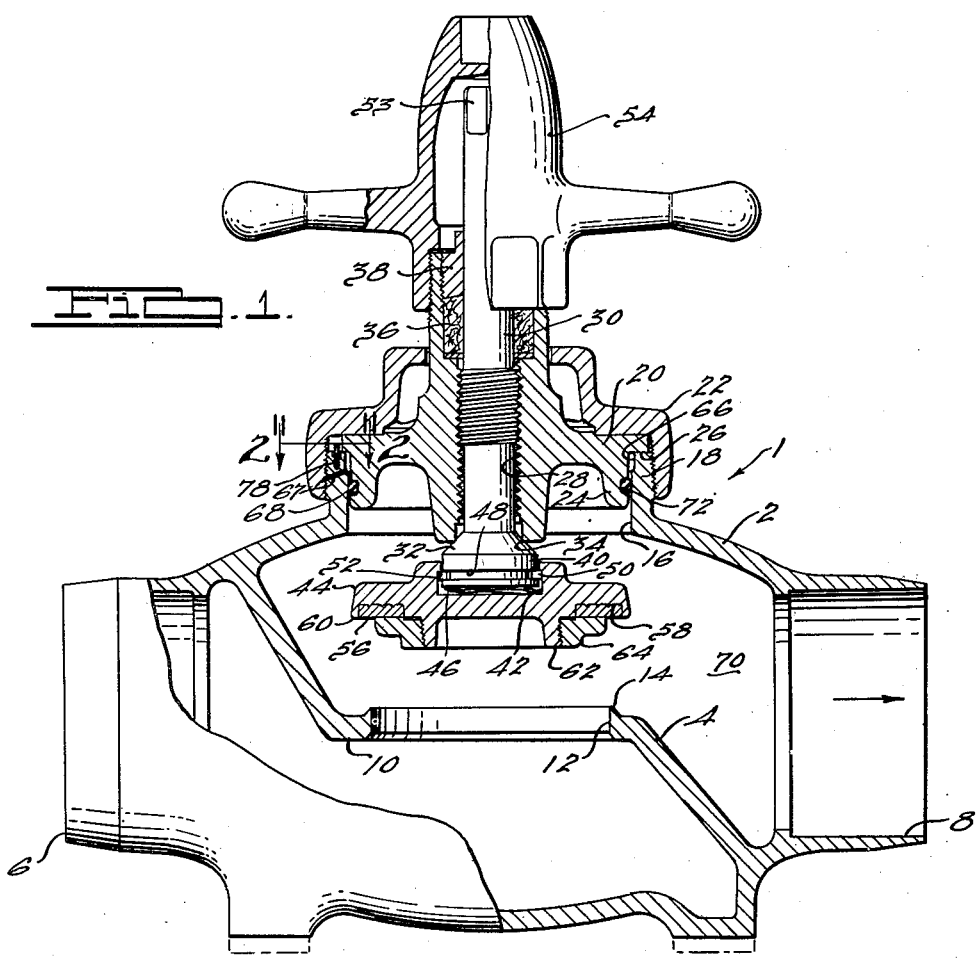
Figures 2, 3:
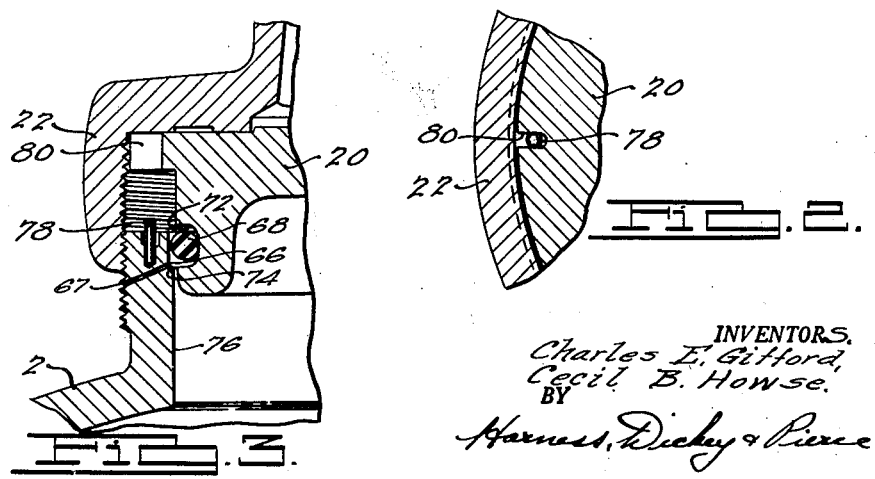

Other objects of this invention will be apparent from the specification, the appended claims and the drawings, in which drawings Figure 1 is a view in partial vertical, central cross section of a valve embodying the invention;

Fig. 2 is a view taken substantially along the lines 2—2 of Fig. 1 and looking in the direction of the arrows; and Fig. 3 is an enlarged view of a portion of the valve showing the bonnet in a partially removed position.

Referring to the drawings by characters of reference, the numeral 1 designates generally a globe-type shutoff valve for fluids provided with a hollow valve body 2 having a cross wall 4 separating the valve inlet 6 from the valve outlet 8. The cross wall 4 is provided with a central longitudinally extending planar section 10 having a valve port 12 extending therethrough provided along its upper periphery with a raised valve seat 14. The upper wall of the valve body 2 is provided with an aperture 16 coaxial with respect to the aperture 12 and having an outwardly extending cylindrical flange 18 surrounding the peripheral edge of the aperture 16. A bonnet 20 is held to the flange 18 by means of a union collar 22 which is internally threaded for threaded connection with external threads on the outer peripheral surface of the cylindrical portion 18. The bonnet 20 is provided with a downwardly extending cylindrical flange 24 which fits within the inner periphery of the cylindrical flange 18 and is provided with a peripheral shoulder 26 which engages the upper end wall of the cylindrical flange 18. The bonnet 20 has an internally threaded aperture 28 coaxial with respect to the seat 14 in which a valve stem 30 is threadedly received.

The lower end portion of the valve stem 30 is provided with an outwardly flaring seating surface 32 which in one position of the valve stem 30 engages a valve seat 34 of the bonnet 20 to seal the aperture 28 against fluid flow. Suitable packing 36 and packing gland 38 are provided in the upper end of the bonnet surrounding the valve stem 30 for preventing escape of fluid through the aperture 28 in positions of the valve stem 30 in which the seating surface 32 is not in engagement with the seat 34. Outwardly of the seating surface 32, the valve stem 30 is provided with a cylindrical section 40 which is preferably of greater diameter than the threaded portion of the stem 30 and which is received within a cylindrical aperture 42 of the circular valve disk holder 44. A wave-type spring washer 46 is located intermediate the lower end portion of the stem 30 and the upwardly facing end wall of the aperture 42. The cylindrical portion 40 is provided with a peripheral groove 48 which receives a C-ring 50 and is of sufficient depth so that when the C-ring is compressed, its outer surface will align with the peripheral surface of the cylindrical portion 40 whereby the cylindrical portion 40 may be inserted into the aperture 42. Upon insertion of the cylindrical portion 40 into the aperture 42, the C-ring will spring outwardly and its upper surface adapted for engagement with a downwardly facing annular shoulder 52 of the cylindrical aperture 42 whereby the wave-type spring washer 46 will then act to resiliently hold the C-ring 50 against the shoulder 52 and the disk holder 44 will be resiliently carried by the valve stem 30.

Upon rotation of the valve stem 30 as by a handle receivable on the squared upper end 53 thereof subsequent to removal of the sealing cap 54, the stem will move longitudinally downwardly whereby the valve disk 56 will engage the valve seat 14 for preventing fluid flow through the valve port 12. The disk 56 is preferably annular in shape and fits within an annular groove 58 in the lower surface 60 of the disk holder 44. A hollow downwardly extending cylindrical boss 62 extending downwardly from the lower surface 60 of the holder 44 is externally threaded for reception of a disk lock nut 64 which engages and holds the disk 56 within the aperture 58. The disk 56 may be and preferably is of a material which is chemically inert with respect to the fluid with which the valve is to be used and, in case of commonly used refrigerant such as Freon 12 and methyl chloride, may be of nylon material.

In order to provide a construction in which if the bonnet is removed from the valve with pressure in the fluid line, without the danger of blowout of the bonnet and injury to the workman, the upper end portion of the cylindrical boss 18 is of enlarged diameter such that upon upward movement of the bonnet 20 the resilient seal between the boss 18 and the O-type sealing ring 68 will be broken to permit the exhausting of the fluid. The relative position of the ring 68, the groove 66 and the length of threads on the collar 22 is so chosen that with the bonnet engaged with the collar 22 the ring 68 is received within the groove 66 prior to complete threaded disengagement of the collar 22 from the boss 18. The groove 66 is provided with one or more exhausting passageways 67 which may extend substantially radially of the boss or flange 18 adjacent its lower end and which passageways 67 are externally open when the collar 22 is partially removed, as shown in Fig. 3. This permits exhausting of the valve body even though the ring 68 might be expanded sufficiently to engage the wall of the groove 66. The O-type packing ring 68 is carried by the bonnet 20 within a peripheral groove 72 in the outer end portion of the cylindrical boss 24. Preferably the lower end portion of the groove 66 is outwardly tapered as at 74 to meet the normal diameter portion 76 of the cylindrical boss 18 so that upon movement of the bonnet 20 into position within the boss 18, the O-type ring may easily be compressed sufficiently to provide a fluid-tight joint between the boss 18 and the bonnet 20.

The upper edge of the boss 18 is provided with an aperture which receives a pin 78 extending outwardly therefrom and receivable within an aperture 80 of the bonnet 20. The pin 78 serves to prevent rotation of the bonnet 20 upon rotation of the valve stem 30 even though the union collar 22 is not threaded on the boss 18 with sufficient force to frictionally hold the bonnet 20. It will be seen that with this construction it is only necessary for the collar 22 to be screwed down snugly against the bonnet 20 and if desired this can merely be a finger-tight connection. The engagement of the collar 22 with the bonnet 20 serves no sealing purpose, such seal being effected by the O-type seal 68. Since in prior valves it has often been difficult to unthread the union collar from the valve body for repair or replacement of the valve part, this provision for sealing the bonnet independently of the tightness with which the union collar is drawn against the bonnet and providing independent means for preventing rotation of the bonnet upon rotation of the valve stem represents a distinct advance in the art.

What is claimed and is desired to be secured by United States Letters Patent is as follows:

1. A fluid tight joint comprising a body member having an access opening through a wall thereof, a removable closure member movable toward and away from said body member for opening and closing said opening to provide access to interior of said body member, said members having telescoping portions defining a chamber, deformable sealing means within said chamber, one of said members having a venting passageway with one portion opening externally of said one member and a second portion opening into said chamber, said sealing means at one relative position of said members being deformed between said members and positioned to seal the interior of said body member from said passageway, said members being relatively movable in a first direction to a second relative position whereby said passageway is open to the interior of said body member, and means cooperable with said members for holding said members in either of said relative positions against outward movement of said closure member due to pressure within said body member and operable to permit complete removal of said closure member from said access opening in said first direction.

2. The combination of claim 1 in which the telescoping portion of a first of said members comprises a first and second portion of different cross-sectional area, one of said cross-sectional portions being of sufficient dimension as to be substantially ineffective to deform said sealing means and the other of said cross-sectional portions being of less dimension whereby it acts to deform said sealing means, and said venting passageway opens into said access opening intermediate said first and said second area portions.

3. In a fluid conveying housing, a body member having an access aperture through one wall thereof provided with a peripheral flange having an inner surface, a removable bonnet member seatable against the outer end of said flange and having a downwardly extending portion telescoping into said flange, sealing means positioned between said surface and said telescoping portion at one relative position of said members, said flange having a venting passageway therethrough with one portion opening outwardly of said body member and a second portion opening into the space between said telescoping portion and said flange, said second passageway portion at said one relative position of said members being sealed from the interior of said body member by said sealing means, means to move said sealing means to open said passageway second portion to the interior of said body member, a removable collar having a telescopic fit with said flange and movable from a first position to a second position, said collar acting in said second position to hold said members in said one relative position, said collar having a portion which when said collar is in said second position covers said passageway one portion and when said collar is in said first position uncovers said passageway one portion.

4. In a fluid conveying housing, a body member having an access aperture through one wall thereof, said aperture having a peripheral surface, said peripheral surface having a normal diameter portion and an enlarged diameter portion spaced outwardly of said normal diameter portion, a bonnet member removable from said body member, a boss on said bonnet member adapted to be received within said aperture when said bonnet member is assembled to said body member, deformable sealing means positioned between the peripheral surface of said boss and said surface, said normal diameter portion being of sufficiently small dimension that at one relative position of said members said sealing means is deformed between said normal diameter portion and said boss to prevent fluid flow through said aperture, said enlarged diameter portion being of sufficient dimension such that at another relative position of said members said sealing means is substantially nondeformed to permit such fluid flow, and means cooperable with said body member to hold said bonnet member against movement outwardly of said body member from either of said relative positions and permitting movement of said bonnet member outwardly of said body member in a direction from said one to said other relative position.

5. The combination of claim 4 in which said body member is provided with an externally threaded cylindrical flange extending outwardly thereof and circumscribing said aperture and in which said holding means comprises a cap member screw-threadedly secured to said flange.

6. In a fluid conveying housing, a body member having an access aperture through one wall thereof, said aperture having a peripheral surface, said peripheral surface having a normal diameter portion, a bonnet member removable from said body member, a boss on said bonnet member adapted to be received within said aperture, sealing means positioned between the peripheral surface of said boss and said aperture, said sealing means being engageable with said normal diameter portion and said boss at one relative position of said member to seal said aperture against fluid flow outwardly of said body member, said peripheral surface being provided with a venting passageway opening outwardly through the inner wall thereof at a location therein which is outwardly of said sealing means at said one relative position of said members, said members being movable in one direction into a second relative position in which said passageway opening is inwardly of said sealing means to permit exhausting of said body member through said passageway and prior to complete removal of said bonnet member from said body member, and selectively adjustable means cooperable with said body member for holding said bonnet member against movement outwardly of said body member from either of said relative portions and to permit removal of said bonnet member from said body member in said one direction.

7. An article of manufacture comprising a body member having an internal chamber, said member having an opening through a wall thereof for providing access to said chamber, said opening having a first portion of a first cross sectional area and a second portion of a second cross sectional area spaced further outwardly from said chamber than said first portion, said second portion being of larger cross sectional area than said first portion, a closure member having a portion insertable from the exterior of said body member into said opening first portion through said opening second portion, a fluid sealing member carried by said closure member portion and movable therewith into said opening first portion where it cooperates to seal the space between said opening first portion and said closure member portion, said sealing member being of such cross sectional area relative to that of said closure member portion and said opening second portion as to permit escape of fluid past said body member through said opening second portion, and releasable holding means cooperable with said body member to permit complete removal of said closure member from said body member opening, and having first and second positions for holding said closure member portion relative to said opening portions, said holding means in said first position being operable to hold said closure member portion against movement outwardly of said opening first portion and in said second position being operable to hold said closure member portion against movement outwardly of said opening second portion.

8. In a valve for fluid systems, a valve body having an internal chamber and having inlet and outlet passageways communicating with said chamber, a wall dividing said chamber into two portions to provide an outlet chamber portion communicating with said outlet passageway, and an inlet chamber portion communicating with said inlet passageway, said wall having a valve port opening therethrough for communicatively connecting said chamber portions, said body being provided with an access aperture opening into one of said chamber portions, said body aperture having a first cross sectional area portion and a second cross sectional area portion positioned outwardly of said one chamber portion from said first area portion, a valve bonnet movable from a position exteriorly of said body to a first position in which a portion thereof is positioned within said first area portion, said bonnet portion being provided with a peripheral groove, a resilient O-ring seal carried in said peripheral groove and cooperable with said first area portion and said bonnet portion to seal said body aperture to prevent passage of fluid therethrough, means cooperable with said body for holding said bonnet in said first position against fluid pressure within said one chamber portion, said bonnet having a second position in which said bonnet portion is within an outer portion of said second area portion, said second area portion being of sufficiently great area to reduce the compressional forces exerted by the wall of said body aperture on said seal, said holding means being cooperable with said body to hold said bonnet in said second position, means for venting fluid from said body chamber when said bonnet is in its said second position, and valve means carried by said bonnet and cooperable with said port to control flow of fluid between said chamber portions.

9. In a valve for fluid systems, a valve body having an internal chamber and having inlet and outlet passageways communicating with said chamber, a wall dividing said chamber into two portions to provide an outlet chamber portion communicating with said outlet passageway, and an inlet chamber portion communicating with said inlet passageway, said wall having a valve port opening therethrough for communicatively connecting said chamber portions, said body being provided with an access aperture opening into one of said chamber portions, said body aperture having a first cross sectional area portion of greater area than the cross sectional area of said port and a second cross sectional area portion positioned outwardly of said one chamber portion from said first area portion and of greater area than said first area portion, a valve bonnet movable from a position exteriorly of said body to a first position in which a portion thereof is positioned within said first area portion, said bonnet portion being provided with a peripheral groove, a resilient O-ring seal carried in said peripheral groove and cooperable with said first area portions and said bonnet portion to seal said body aperture to prevent passage of fluid therethrough, a collar screw-threadedly coupled with said body and having a first position for holding said bonnet in its said first position against fluid pressure within said one chamber portion, said bonnet having a second position in which said bonnet portion is within an outer portion of said second area portion, said second area portion being of sufficiently great area to reduce the compressional forces exerted by the wall of said body opening on seal, said collar having a coupled position with said body to hold said bonnet in its said second position, a venting passageway for venting fluid from said body chamber when said bonnet is in its said second position, said collar having a portion thereof positioned to close said venting passageway when said collar is in its said first position, and valve means carried by said bonnet and removable therewith and cooperable with said port when said bonnet is in its said first position to control flow of fluid between said chamber portions.

10. The combination of claim 9 in which said valve means includes a stem screw-threadedly carried by said bonnet and a valve member carried by said stem and seatable against said port, and said valve member is of lesser cross sectional area than the area of said first area portion.

CHARLES E. GIFFORD.
CECIL B. HOWSE.

REFERENCES CITED

The following references are of record in the file of this patent:

UNITED STATES PATENTS

| Number | Name | Date |
|---|---|---|
| 147,240 | Connell | Feb. 10, 1874 |
| 2,342,276 | Hehemann | Feb. 22, 1944 |
| 2,360,733 | Smith | Oct. 17, 1944 |
| 2,360,839 | Barksdale | Oct. 24, 1944 |
| 2,372,227 | Sanford | Mar. 27, 1945 |
| 2,414,451 | Christensen | Jan. 21, 1947 |
| 2,445,802 | Robinson | July 27, 1948 |
| 2,459,668 | Melichar | Jan. 18, 1949 |
| 2,470,700 | Henry | May 17, 1949 |
| 2,524,142 | Seeloff | Oct. 3, 1950 |

FOREIGN PATENTS

| Number | Country | Date |
|---|---|---|
| 485,051 | Great Britain | of 1938 |